(12) United States Patent
Siy (10) Patent No.: US 10,120,626 B1
(45) Date of Patent: Nov. 6, 2018

(54) INFORMATION PROCESSING APPARATUS, RECORDING MEDIUM, AND INFORMATION PROCESSING METHOD

(71) Applicant: KYOCERA DOCUMENT SOLUTIONS INC., Osaka (JP)

(72) Inventor: Paul Michael Ong Siy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/841,390

(22) Filed: Dec. 14, 2017

(51) Int. Cl.
G06F 3/12 (2006.01)

(52) U.S. Cl.
CPC .......... *G06F 3/1254* (2013.01); *G06F 3/1205* (2013.01); *G06F 3/1206* (2013.01); *G06F 3/1246* (2013.01); *G06F 3/1261* (2013.01)

(58) Field of Classification Search
None
See application file for complete search history.

(56) References Cited

U.S. PATENT DOCUMENTS

| | | | | |
|---|---|---|---|---|
| 2014/0153018 A1* | 6/2014 | Mitsui | ................ | H04N 1/4413 358/1.13 |
| 2014/0207973 A1 | 7/2014 | Robertson et al. | | |
| 2016/0077770 A1 | 3/2016 | Morita | | |
| 2016/0246551 A1 | 8/2016 | Ichikawa et al. | | |
| 2018/0067704 A1* | 3/2018 | Kobayashi | ............ | G06F 3/1205 |
| 2018/0074760 A1* | 3/2018 | Matsuura | ............... | G06F 3/1225 |
| 2018/0077305 A1* | 3/2018 | Nishio | ............... | H04N 1/00503 |

* cited by examiner

*Primary Examiner* — Dung D Tran
(74) *Attorney, Agent, or Firm* — Li & Cai Intellectual Property (USA) Office (57) ABSTRACT

When a processor of an information processing apparatus executes the Custom Printer Properties to realize v4 UPD, the processor (1*a*) opens the Printer Extension, and loads the current print settings from the common Print Ticket, (1*b*) creates model-specific DPB in queried from DPB collection, the DPB collection being collection of DPBs for printer drivers installed in the information processing apparatus, (1*c*) creates model-specific QPB using existing QPB, (1*d*) creates model-specific Print Capabilities using the model-specific QPB and the DPB collection, (1*e*) creates model-specific Print Ticket that represents model-specific print settings using the common Print Ticket, (1*f*) passes the model-specific DPB, the model-specific QPB, the model-specific Print Capabilities, and the model-specific Print Ticket to non-UPD part of the Printer Extension, which allow the non-UPD part of the Printer Extension to display model-specific UI, (1*g*) loads the model-specific print settings from the model-specific Print Ticket, and saves the model-specific print settings.

18 Claims, 4 Drawing Sheets

INFORMATION PROCESSING APPARATUS, RECORDING MEDIUM, AND INFORMATION PROCESSING METHOD

BACKGROUND OF THE INVENTION

1. Field of the Invention

The present disclosure relates to an information processing apparatus configured to execute a v4 printer driver including a printer extension module, a non-transitory computer readable recording medium that stores the printer extension module, and an information processing method.

2. Description of Related Art

Windows 8 (registered trademark), which is an OS (Operating System) developed by Microsoft (registered trademark), employs so-called v4 (Version 4) printer driver architecture. UIs (User Interfaces) of the v4 printer driver support vendor-specific print configuration windows, the vendor being a supplier of image forming apparatuses.

SUMMARY OF THE INVENTION

According to an embodiment of the present disclosure, there is provided an information processing apparatus including:
a communication interface configured to execute communication with a printer;
a memory that stores
Custom Printer Properties that is an application program that configures v4 Universal Printer Driver (UPD), and
v4 printer driver architecture including
Queue Property Bag (QPB) that is a queue-based general storage containing information on a specific queue of a specific printer model,
Driver Property Bag (DPB) that is a model-specific storage containing information on the specific printer model,
Print Capabilities that is a format that represents possible print settings for the specific printer model,
common Print Ticket that is a format that represents current print settings, and
Printer Extension that is an application program providing a user interface (UI); and
a processor, in which
when the processor executes the Custom Printer Properties to realize the v4 UPD, the processor
(1a) opens the Printer Extension, and loads the current print settings from the common Print Ticket,
(1b) creates model-specific DPB in queried from DPB collection, the DPB collection being collection of DPBs for printer drivers installed in the information processing apparatus,
(1c) creates model-specific QPB using existing QPB,
(1d) creates model-specific Print Capabilities using the model-specific QPB and the DPB collection,
(1e) creates model-specific Print Ticket that represents model-specific print settings using the common Print Ticket,
(1f) passes the model-specific DPB, the model-specific QPB, the model-specific Print Capabilities, and the model-specific Print Ticket to non-UPD part of the Printer Extension, which allow the non-UPD part of the Printer Extension to display model-specific UI, and
(1g) loads the model-specific print settings from the model-specific Print Ticket, and saves the model-specific print settings.

According to an embodiment of the present disclosure, there is provided a non-transitory computer readable recording medium that stores Custom Printer Properties that is an application program that configures v4 Universal Printer Driver (UPD), the Custom Printer Properties causing a processor of a computer including
a communication interface configured to execute communication with a printer, and
a memory that stores
v4 printer driver architecture including
Queue Property Bag (QPB) that is a queue-based general storage containing information on a specific queue of a specific printer model,
Driver Property Bag (DPB) that is a model-specific storage containing information on the specific printer model,
Print Capabilities that is a format that represents possible print settings for the specific printer model,
common Print Ticket that is a format that represents current print settings, and
Printer Extension that is an application program providing a user interface (UI),
to
(1a) open the Printer Extension, and load the current print settings from the common Print Ticket,
(1b) create model-specific DPB in queried from DPB collection, the DPB collection being collection of DPBs for printer drivers installed in the information processing apparatus,
(1c) create model-specific QPB using existing QPB,
(1d) create model-specific Print Capabilities using the model-specific QPB and the DPB collection,
(1e) create model-specific Print Ticket that represents model-specific print settings using the common Print Ticket,
(1f) pass the model-specific DPB, the model-specific QPB, the model-specific Print Capabilities, and the model-specific Print Ticket to non-UPD part of the Printer Extension, which allow the non-UPD part of the Printer Extension to display model-specific UI, and
(1g) load the model-specific print settings from the model-specific Print Ticket, and saves the model-specific print settings.

According to an embodiment of the present disclosure, there is provided an information processing method for an information processing apparatus, including
a communication interface configured to execute communication with a printer,
a memory that stores
Custom Printer Properties that is an application program that configures v4 Universal Printer Driver (UPD), and
v4 printer driver architecture including
Queue Property Bag (QPB) that is a queue-based general storage containing information on a specific queue of a specific printer model,
Driver Property Bag (DPB) that is a model-specific storage containing information on the specific printer model,
Print Capabilities that is a format that represents possible print settings for the specific printer model, common Print Ticket that is a format that represents current print settings, and Printer Extension that is an application program providing a user interface (UI), and a processor, the information processing method including:

by executing the Custom Printer Properties to realize the v4 UPD by the processor, (1a) opening the Printer Extension, and loading the current print settings from the common Print Ticket;

(1b) creating model-specific DPB in queried from DPB collection, the DPB collection being collection of DPBs for printer drivers installed in the information processing apparatus;

(1c) creating model-specific QPB using existing QPB;

(1d) creating model-specific Print Capabilities using the model-specific QPB and the DPB collection;

(1e) creating model-specific Print Ticket that represents model-specific print settings using the common Print Ticket;

(1f) passing the model-specific DPB, the model-specific QPB, the model-specific Print Capabilities, and the model-specific Print Ticket to non-UPD part of the Printer Extension, which allow the non-UPD part of the Printer Extension to display model-specific UI; and (1g) loading the model-specific print settings from the model-specific Print Ticket, and saving the model-specific print settings.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Hardware Configuration of Information Processing Apparatus

Figure 1:
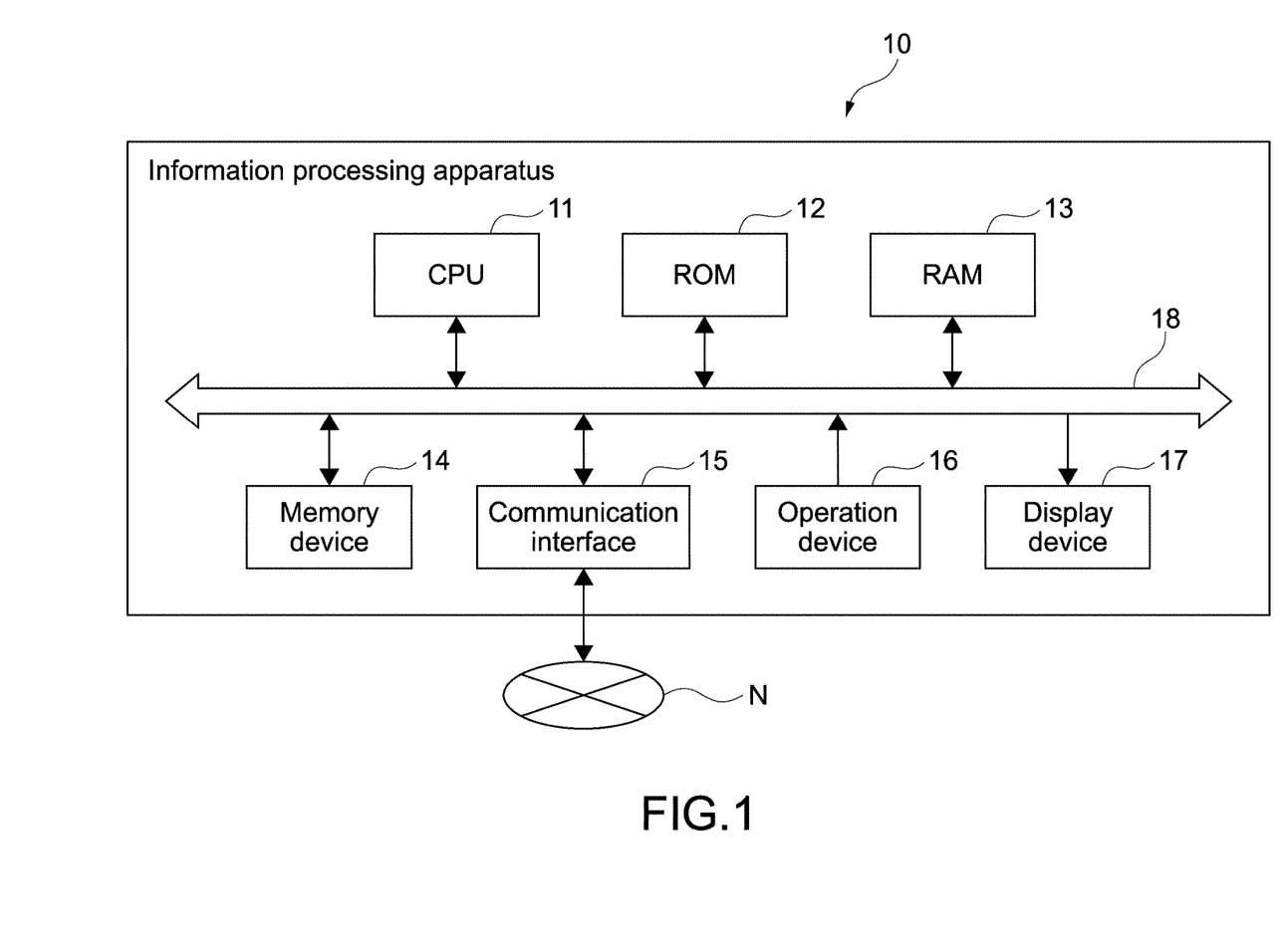
FIG. 1 shows a hardware configuration of an information processing apparatus according to an embodiment of the present disclosure.

FIG. 1 shows a hardware configuration of an information processing apparatus according to an embodiment of the present disclosure.

The information processing apparatus 10 is typically a personal computer or a tablet device. The information processing apparatus 10 may include the CPU (Central Processing Unit) 11 (processor), the ROM (Read Only Memory) 12 (memory), the RAM (Random Access Memory) 13, the memory devices 14, the communication interface 15, the operation devices 16, and the display device 17. The information processing apparatus 10 may further include the bus 18 connecting them.

The CPU 11 (processor) loads information processing programs (described later), which are stored in the ROM 12 (memory), in the RAM 13 and executes the information processing programs. The ROM 12 is a nonvolatile memory, and stores the programs that the CPU 11 executes, data, and the like. The ROM 12 is an example of a non-transitory computer readable recording medium.

The memory devices 14 may include a large-volume recording medium such as an HDD (Hard Disk Drive) and an SSD (Solid State Drive) and an external recording medium such as a USB (Universal Serial Bus) memory.

The communication interface 15 is an interface configured to connect to the network N. The communication interface 15 is configured to communicate with the image forming apparatus (printer such as Multifunction Peripheral (MFP)) 20 via the network N such as the Internet and a LAN (Local Area Network).

The operation devices 16 may include a keyboard, a mouse, a touchpad, and various switches. The operation devices 16 detect operations input by a user and output signals based on the detected operations to the CPU 11.

The display device 17 may include an LCD, an organic EL display, or the like. The display device 17 executes calculation processing on the basis of information received from the CPU 11, and displays images on the display on the basis of generated image signals.

2. Functional Configuration of Information Processing Apparatus

Figure 2:
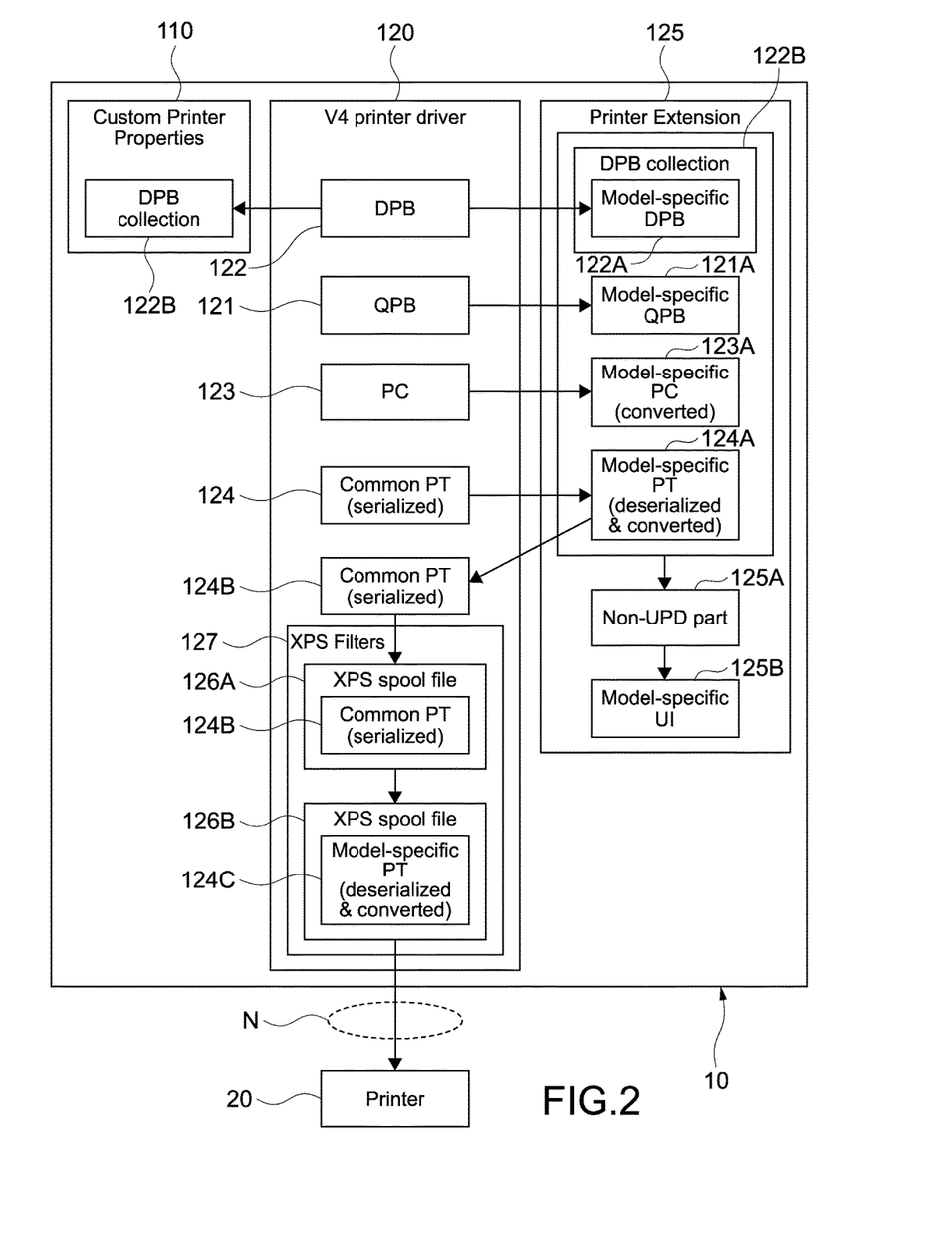
FIG. 2 shows a functional configuration of the information processing apparatus.

FIG. 2 shows a functional configuration of the information processing apparatus.

The ROM 12 stores Custom Printer Properties 110 and Microsoft v4 printer driver architecture 120.

The Custom Printer Properties 110 is an application program that configures the target model of v4 Universal Printer Driver (UPD) by modifying certain properties in the Queue Property Bag (QPB) 121. One possible method of configuring the target model of v4 UPD is thru discovery of supported models in the network N. Another possible method is by directly specifying the target printer 20 in the network N.

Microsoft v4 printer driver architecture 120 includes the QPB 121, Driver Property Bag (DPB) 122, Print Capabilities 123, Print Ticket 124, and Printer Extension 125.

The QPB 121 is a printer queue-based general storage. Each instance of the printer 20 on the computer device shall have its own values. In the v4 Universal Printer Driver 120, certain properties represent the model of the printer 20 and the device configuration of the printer 20. These certain properties allow the v4 UPD to provide the Print Capabilities 123 and the Print Ticket 124 that is specific to the model of the printer 20 and the configuration of the printer 20.

The DPB 122 is a read-only model-specific storage. The DPB 122 usually contains information on the model of the printer 20.

The Print Capabilities 123 is a format that represents the possible print settings for the specific model of the printer 20. The Printer Extension 125 uses the Print Capabilities 123 to determine the possible print settings and displays as UI the possible print settings accordingly.

The Print Ticket 124 is a format that represents a print setting. The Printer Extension 125 gets the print settings from the Print Ticket 124 to display as the UI to a user. The Printer Extension 125 also sets the print settings saved into the Print Ticket 124 in response to an instruction from the user. During printing, the Print Ticket 124 determines the print settings of the print job.

The Printer Extension 125 provides a better UI for the user to set the print settings. The UI that the Printer Extension 125 provides replaces the standard UI that the Operation System (OS) provides for printing preferences of the user.

3. First Operational Flow (Loading/Saving the Print Settings Thru the Printer Extension (UI))

Figure 3:
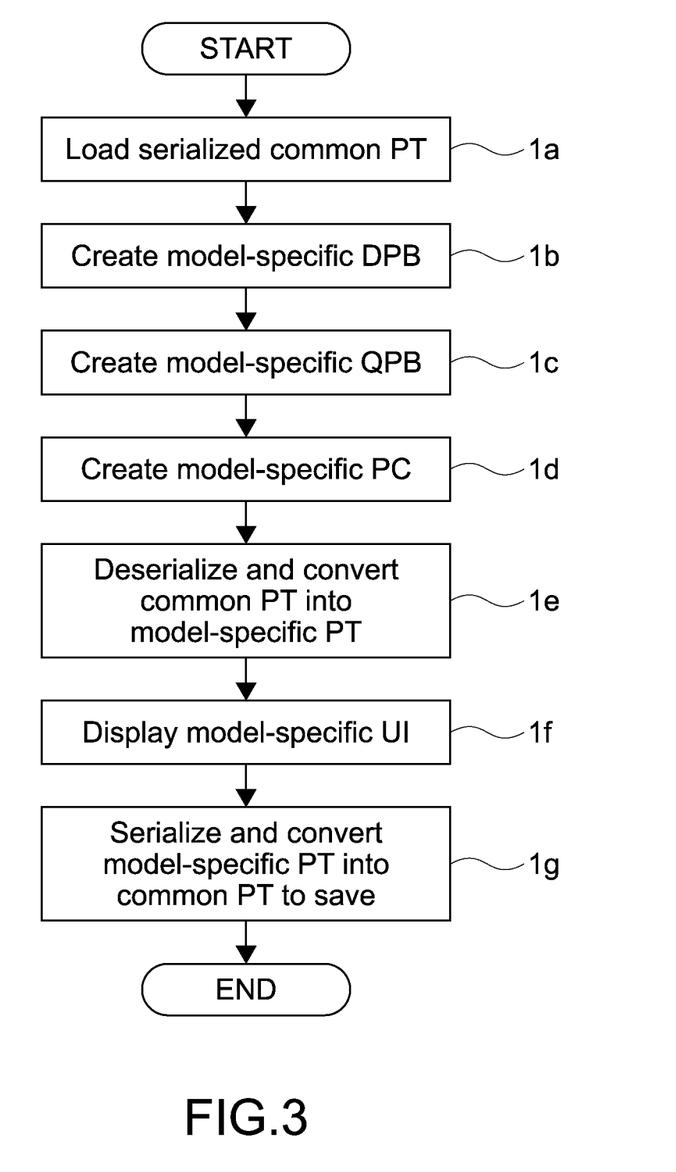
FIG. 3 shows a first operational flow.

FIG. 3 shows a first operational flow (loading/saving the print settings thru the Printer Extension (UI)) of the information processing apparatus.

The CPU 11 (processor) executes the Custom Printer Properties 110 to realize the v4 UPD as follows.

(Step 1*a*) The CPU 11 opens the Printer Extension 125, and loads the current print settings from the common Print Ticket 124. The common Print Ticket 124 contains serialized data of the model-specific print settings.

(Step 1*b*) The CPU 11 creates model-specific DPB 122A in queried from DPB collection 122B. The DPB collection 122B is collection of DPBs 122 for printer drivers for supported printer driver models.

(Step 1*c*) The CPU 11 creates model-specific QPB 121A using existing QPB 121. The model-specific QPB 121A has additional properties specific to the printer 20.

(Step 1*d*) The CPU 11 creates model-specific Print Capabilities 123A using the model-specific QPB 121A and the DPB collection 122B. Specifically, the model information from the QPB 121 decides which DPB 122 in the DPB collection 122B to use. The model-specific Print Capabilities 123A matches the model and current configuration of the printer 20.

(Step 1*e*) The CPU 11 creates model-specific Print Ticket 124A that represents model-specific print settings using the common Print Ticket 124.

Specifically, the CPU 11 creates the model-specific Print Ticket 124A by deserializing and converting the common Print Ticket 124 into the model-specific Print Ticket 124A.

(Step 1*f*) The CPU 11 passes the model-specific DPB 122A, the model-specific QPB 121A, the model-specific Print Capabilities 123A, and the model-specific Print Ticket 124A to non-UPD part 125A of the Printer Extension 125, which allow the non-UPD part 125A of the Printer Extension 125 to display model-specific UI 125B. Specifically, the non-UPD part 125A of the Printer Extension 125 uses the additional properties (see Step 1c) to display the model-specific UI 125B.

(Step 1*g*) The CPU 11 loads the model-specific print settings from the model-specific Print Ticket 124A, and saves the model-specific print settings. Specifically, the CPU 11 saves the model-specific print settings by serializing and converting the model-specific Print Ticket 124A into the common Print Ticket 124B to save the common Print Ticket 124B.

Note that the Steps 1*b*, 1*c*, 1*d*, and 1*e* do not need to be executed in the above-mentioned particular order.

4. Second operational flow (printing a document)

Figure 4:
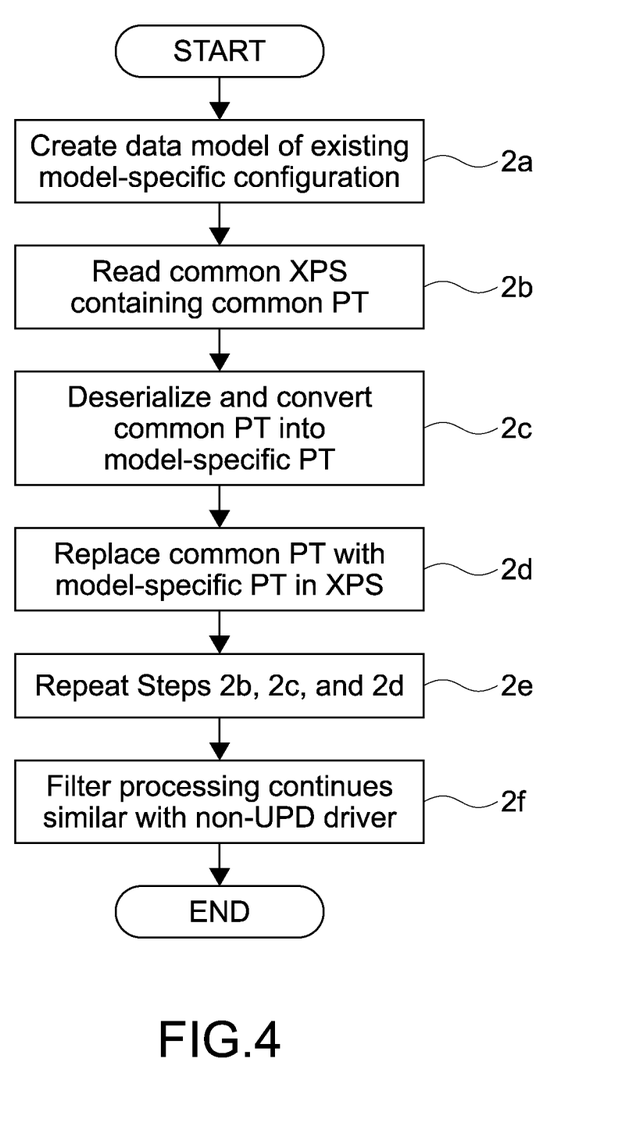
FIG. 4 shows a second operational flow.

FIG. 4 shows a second operational flow (printing a document) of the information processing apparatus.

The CPU 11 (processor) further executes the Custom Printer Properties 110 to realize the v4 UPD as follows.

When printing a document using the v4 UPD, the CPU 11 operates as XPS filters 127 to create an XPS spool file 126A. The XPS filters 127 are also referred to as simply filters or XPS filter pipeline for Microsoft. The XPS spool file 126A contains the print settings in the format of the common Print Ticket 124B.

(Step 2*a*) The CPU 11 creates a data model of existing model-specific configuration from the DPB collection 122B and the QPB 121.

(Step 2*b*) The CPU 11 operates as XPS filters 127 to read the common Print Ticket from XML Paper Specification (XPS) spool file 126A, the XPS spool file 126A containing the print settings in the format of the common Print Ticket 124B.

(Step 2*c*) The CPU 11 operates as XPS filters 127 to modify the XPS spool file 126A containing the print settings in the format of the common Print Ticket 124B. Specifically, the CPU 11 operates as XPS filters 127 to create the model-specific Print Ticket 124C from the common Print Ticket 124B by deserializing and converting the common Print Ticket 124B into the model-specific Print Ticket 124C. The DPB collection 122B together with the QPB 121 is used to add model-specific entries to the model-specific Print Ticket 124C.

(Step 2*d*) The CPU 11 operates as XPS filters 127 to replace the common Print Ticket 124B with the model-specific Print Ticket 124C in the XPS spool file 126B, and sends the XPS spool file 126B to the rest of the XPS filters 127.

(Step 2*e*) The CPU 11 repeats the Steps 2*b*, 2*c*, and 2*d* with each Print Ticket 124B in the XPS spool file 126A (Job, Document, Page).

(Step 2*f*) Once the model-specific Print Ticket 124C is generated, the filter processing continues similarly with a non-UPD driver.

5. Modification Example

In the aforementioned embodiment, as shown in FIG. 2, the Custom Printer Properties 110 stores the DPB collection 122B and the Printer Extension 125 stores the DPB collection 122B independently. In other words, the plurality of separate DPB collections 122B are stored in the plurality of separate areas.

Alternatively, one common DPB collection 122B may be provided, and the Custom Printer Properties 110 and the Printer Extension 125 may access the one common DPB collection 122B. According to this example, firstly, it may be easy to add a new device to be supported to the one common DPB collection 122B. Secondly, it is not necessary to confirm whether a plurality of separate DPB collections store the same information or not.

6. Conclusion

According to the present disclosure, the CPU 11 creates the model-specific Print Ticket 124A by deserializing and converting the common Print Ticket 124 into the model-specific Print Ticket 124A (Step 1*e*). The CPU 11 saves the model-specific print settings by serializing and converting the model-specific Print Ticket 124A into the common Print Ticket 124B to save the common Print Ticket 124B (Step 1*g*). This data serialization/deserialization allows the use of the common v4 UPD Print Ticket 124B to save model-specific print settings.

Therefore, according to the present disclosure, the v4 UPD is a printer driver that supports multiple printer models and uses the Microsoft v4 Printer Driver architecture. The v4 UPD allows the user to install one v4 printer driver 120 and use it across multiple supported printer models.

The Custom Printer Properties module 110 configures the v4 UPD. This configuration process saves various printer information (model, device options, HDD, etc.) into the QPB 121 of the v4 UPD. Once configured, the v4 UPD will behave very similar to a model-specific printer driver. It will have the same features (staple, punch, fold, etc.) and options.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a communication interface configured to execute communication with a printer;
a memory that stores
Custom Printer Properties that is an application program that configures v4 Universal Printer Driver (UPD), and
v4 printer driver architecture including
Queue Property Bag (QPB) that is a queue-based general storage containing information on a specific queue of a specific printer model,
Driver Property Bag (DPB) that is a model-specific storage containing information on the specific printer model,
Print Capabilities that is a format that represents possible print settings for the specific printer model,
common Print Ticket that is a format that represents current print settings, and
Printer Extension that is an application program providing a user interface (UI); and
a processor, wherein
when the processor executes the Custom Printer Properties to realize the v4 UPD, the processor
(1a) opens the Printer Extension, and loads the current print settings from the common Print Ticket,
(1b) creates model-specific DPB in queried from DPB collection, the DPB collection being collection of DPBs for printer drivers installed in the information processing apparatus,
(1c) creates model-specific QPB using existing QPB,
(1d) creates model-specific Print Capabilities using the model-specific QPB and the DPB collection,
(1e) creates model-specific Print Ticket that represents model-specific print settings using the common Print Ticket,
(1f) passes the model-specific DPB, the model-specific QPB, the model-specific Print Capabilities, and the model-specific Print Ticket to non-UPD part of the Printer Extension, which allow the non-UPD part of the Printer Extension to display model-specific UI, and
(1g) loads the model-specific print settings from the model-specific Print Ticket, and saves the model-specific print settings.

2. The information processing apparatus according to claim 1, wherein
when the processor executes the Custom Printer Properties to realize the v4 UPD, the processor further
(2a) creates a data model of existing model-specific configuration from the DPB collection and the QPB,
(2b) reads the common Print Ticket from XML Paper Specification (XPS) spool file, the XPS spool file containing the print settings in the common Print Ticket,
(2c) creates the model-specific Print Ticket from the common Print Ticket, and
(2d) replaces the common Print Ticket with the model-specific Print Ticket in the XPS spool file, and sends the XPS spool file to the printer.

3. The information processing apparatus according to claim 2, wherein
in the step (1a), the processor loads the current print settings from the common Print Ticket, the common Print Ticket containing serialized data of the model-specific print settings, and
in the step (1e), the processor creates the model-specific Print Ticket by deserializing and converting the common Print Ticket into the model-specific Print Ticket.

4. The information processing apparatus according to claim 3, wherein in the step (1g), the processor saves the model-specific print settings by serializing and converting the model-specific Print Ticket into the common Print Ticket to save the common Print Ticket,
in the step (2c), the processor creates the model-specific Print Ticket from the common Print Ticket by deserializing and converting the common Print Ticket into the model-specific Print Ticket.

5. The information processing apparatus according to claim 1, wherein
in the step (1c), the processor creates the model-specific QPB, the model-specific QPB having additional properties, and
in the step (1f), the non-UPD part of the Printer Extension uses the additional properties to display the model-specific UI.

6. The information processing apparatus according to claim 1, wherein
in the step (1d), the processor creates the model-specific Print Capabilities, the model-specific Print Capabilities matching the model and current configuration of the printer.

7. A non-transitory computer readable recording medium that stores Custom Printer Properties that is an application program that configures v4 Universal Printer Driver (UPD), the Custom Printer Properties causing a processor of a computer including
a communication interface configured to execute communication with a printer, and
a memory that stores
v4 printer driver architecture including
Queue Property Bag (QPB) that is a queue-based general storage containing information on a specific queue of a specific printer model,
Driver Property Bag (DPB) that is a model-specific storage containing information on the specific printer model,
Print Capabilities that is a format that represents possible print settings for the specific printer model,
common Print Ticket that is a format that represents current print settings, and
Printer Extension that is an application program providing a user interface (UI),
to
(1a) open the Printer Extension, and load the current print settings from the common Print Ticket,
(1b) create model-specific DPB in queried from DPB collection, the DPB collection being collection of DPBs for printer drivers installed in the information processing apparatus,
(1c) create model-specific QPB using existing QPB,
(1d) create model-specific Print Capabilities using the model-specific QPB and the DPB collection,
(1e) create model-specific Print Ticket that represents model-specific print settings using the common Print Ticket,
(1f) pass the model-specific DPB, the model-specific QPB, the model-specific Print Capabilities, and the model-specific Print Ticket to non-UPD part of the Printer Extension, which allow the non-UPD part of the Printer Extension to display model-specific UI, and (1g) load the model-specific print settings from the model-specific Print Ticket, and saves the model-specific print settings.

8. The recording medium according to claim 7, wherein the Custom Printer Properties further causes the processor of the computer to
(2a) create a data model of existing model-specific configuration from the DPB collection and the QPB,
(2b) read the common Print Ticket from XML Paper Specification (XPS) spool file, the XPS spool file containing the print settings in the common Print Ticket,
(2c) create the model-specific Print Ticket from the common Print Ticket, and
(2d) replace the common Print Ticket with the model-specific Print Ticket in the XPS spool file, and sends the XPS spool file to the printer.

9. The recording medium according to claim 8, wherein in the step (1a), the Custom Printer Properties causes the processor of the computer to load the current print settings from the common Print Ticket, the common Print Ticket containing serialized data of the model-specific print settings, and
in the step (1e), the Custom Printer Properties causes the processor of the computer to create the model-specific Print Ticket by deserializing and converting the common Print Ticket into the model-specific Print Ticket.

10. The recording medium according to claim 9, wherein in the step (1g), the Custom Printer Properties causes the processor of the computer to save the model-specific print settings by serializing and converting the model-specific Print Ticket into the common Print Ticket to save the common Print Ticket,
in the step (2c), the Custom Printer Properties causes the processor of the computer to create the model-specific Print Ticket from the common Print Ticket by deserializing and converting the common Print Ticket into the model-specific Print Ticket.

11. The recording medium according to claim 7, wherein in the step (1c), the Custom Printer Properties causes the processor of the computer to create the model-specific QPB, the model-specific QPB having additional properties, and
in the step (1f), the non-UPD part of the Printer Extension uses the additional properties to display the model-specific UI.

12. The recording medium according to claim 7, wherein in the step (1d), the Custom Printer Properties causes the processor of the computer to create the model-specific Print Capabilities, the model-specific Print Capabilities matching the model and current configuration of the printer.

13. An information processing method for an information processing apparatus including
a communication interface configured to execute communication with a printer,
a memory that stores
Custom Printer Properties that is an application program that configures v4 Universal Printer Driver (UPD), and
v4 printer driver architecture including
Queue Property Bag (QPB) that is a queue-based general storage containing information on a specific queue of a specific printer model,
Driver Property Bag (DPB) that is a model-specific storage containing information on the specific printer model,
Print Capabilities that is a format that represents possible print settings for the specific printer model,
common Print Ticket that is a format that represents current print settings, and
Printer Extension that is an application program providing a user interface (UI), and
a processor,
the information processing method comprising:
by executing the Custom Printer Properties to realize the v4 UPD by the processor,
(1a) opening the Printer Extension, and loading the current print settings from the common Print Ticket;
(1b) creating model-specific DPB in queried from DPB collection, the DPB collection being collection of DPBs for printer drivers installed in the information processing apparatus;
(1c) creating model-specific QPB using existing QPB;
(1d) creating model-specific Print Capabilities using the model-specific QPB and the DPB collection;
(1e) creating model-specific Print Ticket that represents model-specific print settings using the common Print Ticket;
(1f) passing the model-specific DPB, the model-specific QPB, the model-specific Print Capabilities, and the model-specific Print Ticket to non-UPD part of the Printer Extension, which allow the non-UPD part of the Printer Extension to display model-specific UI; and
(1g) loading the model-specific print settings from the model-specific Print Ticket, and saving the model-specific print settings.

14. The information processing method according to claim 13, further comprising:
by executing the Custom Printer Properties to realize the v4 UPD by the processor,
(2a) creating a data model of existing model-specific configuration from the DPB collection and the QPB;
(2b) reading the common Print Ticket from XML Paper Specification (XPS) spool file, the XPS spool file containing the print settings in the common Print Ticket;
(2c) creating the model-specific Print Ticket from the common Print Ticket; and
(2d) replacing the common Print Ticket with the model-specific Print Ticket in the XPS spool file, and sends the XPS spool file to the printer.

15. The information processing method according to claim 14, wherein in the step (1a), the common Print Ticket contains serialized data of the model-specific print settings, and
in the step (1e), creating the model-specific Print Ticket includes deserializing and converting the common Print Ticket into the model-specific Print Ticket.

16. The information processing method according to claim 15, wherein
in the step (1g), saving the model-specific print settings includes serializing and converting the model-specific Print Ticket into the common Print Ticket to save the common Print Ticket,
in the step (2c), creating the model-specific Print Ticket from the common Print Ticket includes deserializing and converting the common Print Ticket into the model-specific Print Ticket.

17. The information processing method according to claim 13, wherein in the step (1c), the model-specific QPB has additional properties, and in the step (1f), the non-UPD part of the Printer Extension uses the additional properties to display the model-specific UI.

18. The information processing method according to claim 13, wherein in the step (1d), the model-specific Print Capabilities matches the model and current configuration of the printer.

* * * * *